May 21, 1963

K. G. EVANS 3,090,372

BARBECUE ATTACHMENT

Filed Aug. 22, 1960

INVENTOR.
KENNETH G. EVANS

BY

Lippincott, Ralls & Hendrickson
ATTORNEYS

May 21, 1963

K. G. EVANS 3,090,372

BARBECUE ATTACHMENT

Filed Aug. 22, 1960

INVENTOR.
KENNETH G. EVANS

BY

Lippincott, Ralls & Hendrickson
ATTORNEYS

United States Patent Office 3,090,372
Patented May 21, 1963

3,090,372
BARBECUE ATTACHMENT
Kenneth G. Evans, 1307 Santa Fe Ave., Berkeley, Calif.
Filed Aug. 22, 1960, Ser. No. 51,032
2 Claims. (Cl. 126—25)

The present invention relates to an improvement in equipment for broiling food over an open fire, such equipment being generally termed a "barbecue."

With the widespread popularity of portable barbecues, it has become commonplace for a substantial amount of home and camp cooking to be done over an open fire of charcoal. This type of cooking is particularly adapted to the preparation of meat, fish, and fowl, as a unique flavor is possible thereby. Because of the nature of this type of cooking, certain difficulties are attendant thereto and among these is the requirement of constant attention to prevent flaming of the charcoal and uneven cooking. Associated with these is the probability of substantial smoking of the fire from grease, or the like, dripping thereon from the food being cooked, and the difficulties this causes the cook not only in obscuring the food but in eye irritation. Furthermore, many recipes require frequent basting to prevent burning, and to form particular coatings or crusts over the food, as upon chicken, or the like.

The present invention is adapted for attachment to conventional barbecues for overcoming the above-noted and other difficulties or limitations of same. The attachment of the present invention to a conventional, portable barbecue, for example, of the popular circular type, substantially precludes charcoal flame-up, uneven cooking, difficulties in basting, and very materially reduces the attention required for barbecuing. The present invention is particularly directed to barbecuing of meat, fish, or fowl in relatively small pieces that require the use of a grill or grate, for spit cooking is available for larger pieces such as whole chickens, or the like.

The foregoing advantages are herein attained by the driven rotation of the grill employed to support foodstuffs over the open fire. There is provided for engagement of a flexible drive means to the rotatably mounted grill to slowly rotate same in a horizontal plane, whereby each, individual piece of meat, or the like, on the grill is moved over the fire beneath so as to even out the heat received thereby and to distribute drippings therefrom. This, then, precludes the "hot spots" in the fire from unevenly cooking the meat, or the like, and limits "flame-up" and smoking from large grease deposits upon burning charcoal. As the grill slowly rotates, each part thereof passes the front of the barbecue so that basting is facilitated, and, of course, no manual turning of the grill is necessary. Not only does the present invention accomplish the foregoing and other improvements in barbecuing, but further, the apparatus hereof does so without the disadvantages, complexity, or cost that might be expected to be associated therewith. Inasmuch as a large plurality of barbecues are conventionally equipped with spit and motor, the present invention is adapted to utilize the spit motor, as well as the mounting therefor. Additionally, the present invention fits varying sizes of barbecues, and accommodates without adjustment variations in the vertical placement of the barbecue grill.

Various possible objects and advantages of the present invention will become apparent to those skilled in the art from the following description of a single, preferred embodiment hereof; however, no limitation is intended by the terms of this description, and instead, reference is made to the appended claims for a precise delineation of the true scope of the present invention.

The invention is illustrated in the accompanying drawings, wherein.

Figure 1:
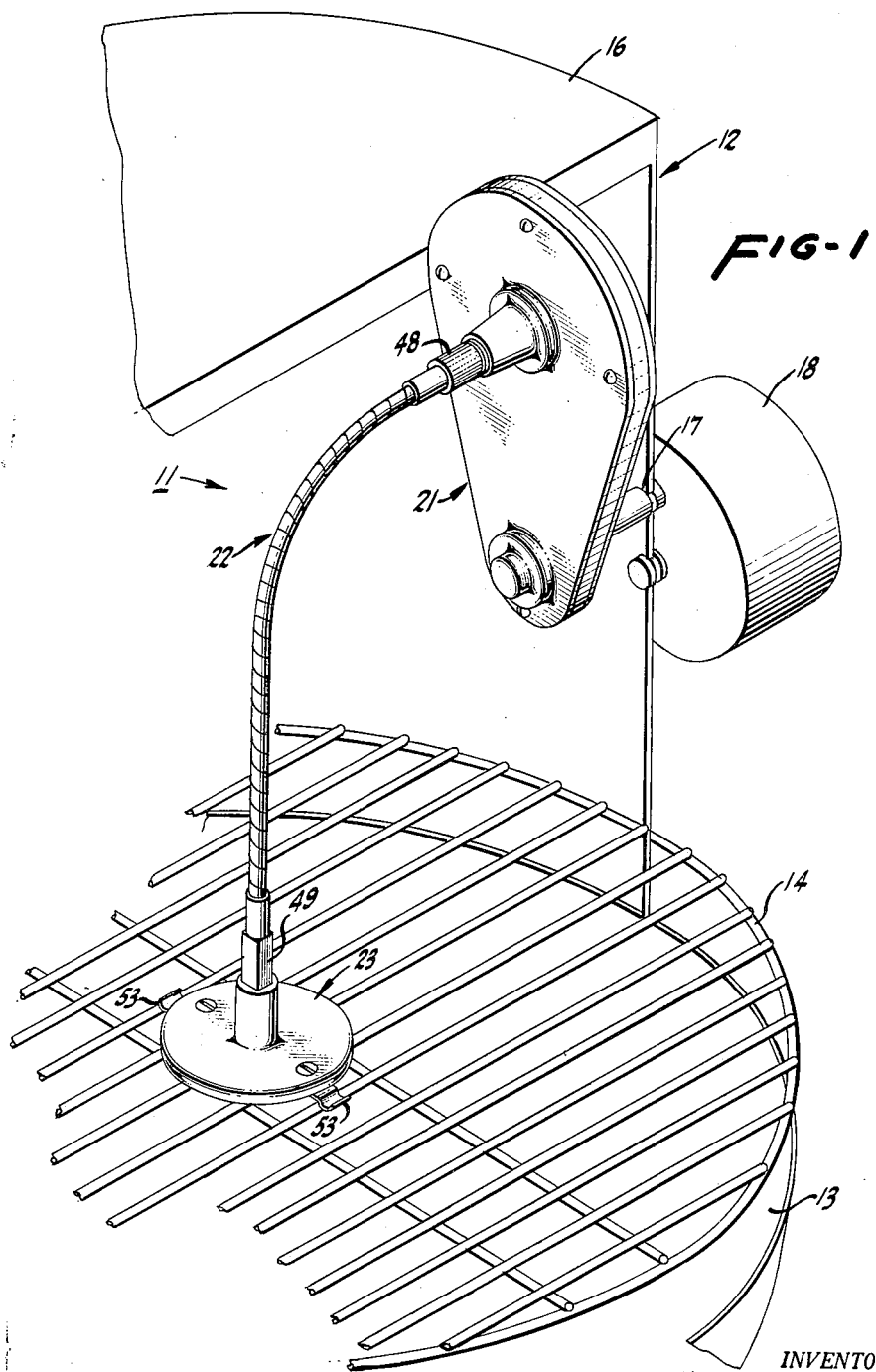
FIG. 1 is a partial perspective view of the improved barbecue attachment of the present invention cooperating with and mounted upon a conventional, portable barbecue.

Considering first the invention in general, particularly as regards the cooperation of same with a conventional, portable barbecue, reference is made to FIG. 1 of the drawings, wherein there is shown the attachment 11 mounted upon and cooperating with a barbecue 12, therein illustrated in phantom. The barbecue 12 may include a fire box 13 having a circular grill or grate 14 rotatably mounted above same and adapted for vertical adjustment as by a handwheel below the firebox, not shown. A hood 16 fits over at least a part of the grill and is conventionally provided with one or more notches 17 in the edges thereof for mounting a spit motor 18 adapted to rotate a spit disposed across the firebox. Normally the spit and grill are employed alternatively as only large pieces are spitted, however, the present invention provides for utilization of the spit motor to rotate the grill in a horizontal plane.

The present invention includes a reduction unit 21 adapted for removable attachment to the spit motor 18, together with a flexible shaft 22 extending from the reduction unit in a curve downwardly to the center of the grill 14 into removable engagement with an adapter 23 engaging the grill. By the use of a flexible drive means the attachment hereof accommodates vertical adjustment of the grill during rotation of same. Also the drive mechanism and reduction unit are laterally displaced from the area of most intense heat immediately over the center of the firebox to prevent overheating of these elements. Additionally, it will be appreciated that meat, or the like, cooked upon the grill will be at least in part rendered to thereby drip grease downwardly, and such normally drips at least in part down a central shaft upon which the grill is rotatably mounted. Consequently, attempts to rotate the grill from the axis thereof, either above or below the grill, suffer from severe limitations either by overheating or by flooding with hot grease. Attachment of the present invention to a conventional barbecue is quite simple and rapid, for it is only necessary to engage the reduction unit with the spit motor of the barbecue and to attach the adapter 23 to the center of the grill and then to place the flexible shaft 22 in engagement between the reduction unit and adapter. Upon energization of the spit motor of the barbecue, there will be transmitted a force through the reduction unit and the flexible shaft to the grill for slowly rotating the latter is a horizontal plane. It is highly advantageous that this rotation of the grill be maintained at a very low rate, in order that food disposed upon the grill will not be thrown therefrom by centrifugal force, or that such food will be cooled by rapid movement of same through the air. Thus, the reduction unit hereof serves the purpose of providing a desired rate of rotation to the grill, while yet employing the motive power of the spit motor normally provided with the barbecue, so as to thereby materially reduce the cost of the attachment of this invention.

Figure 2:
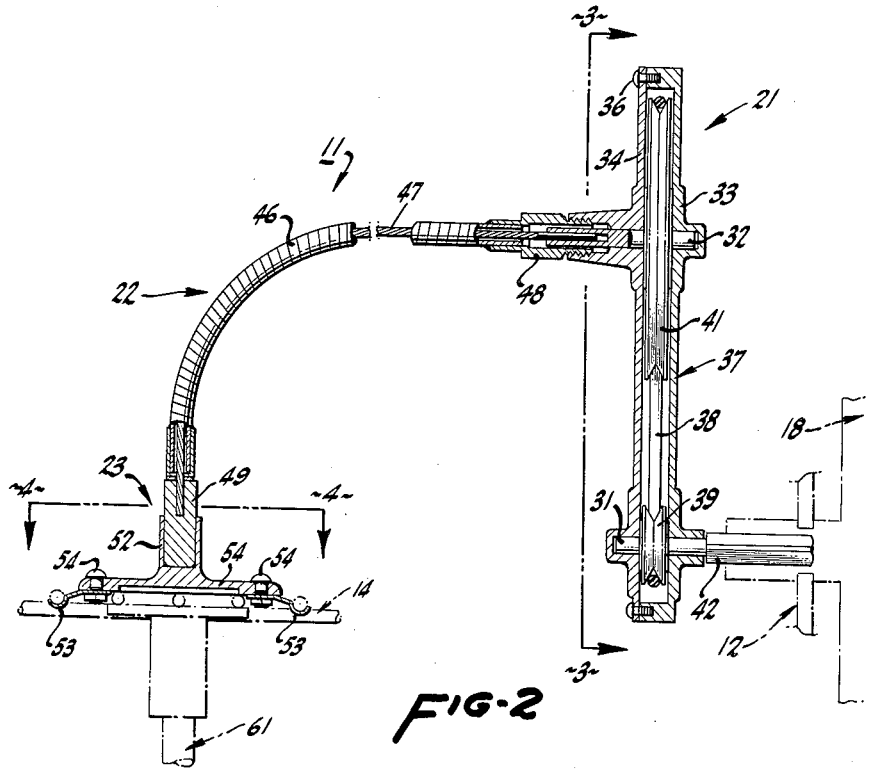
FIG. 2 is a transverse sectional view through the entire barbecue attachment of the present invention.
Figure 3:
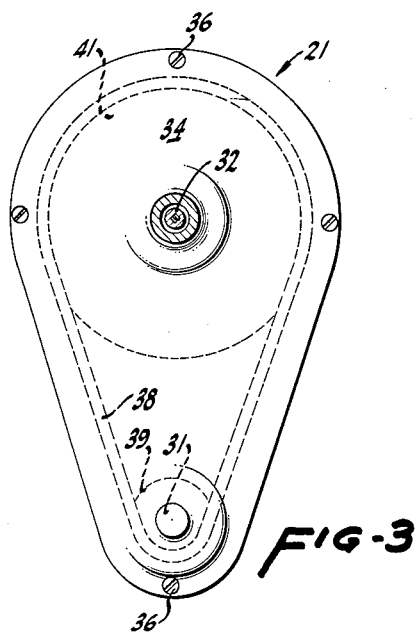
FIG. 3 is a sectional view taken in the plane 3—3 of FIG. 2 and illustrating the reduction unit in plan view.
Figure 4:
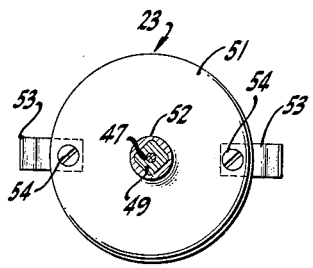
FIG. 4 is a sectional view taken in the plane 4—4 of FIG. 2 and illustrating the adapter unit in plan view.

Considering now the present invention in somewhat greater detail, and referring to FIGS. 2, 3 and 4, it will be seen that the reduction unit 21 includes a lower shaft 31 extending therefrom for removable engagement with a shaft of the motor 18. This lower shaft 31 is driven by the motor 18 and transmits rotary motion to an upper shaft 32 of the reduction unit, which extends oppositely to the lower shaft. Both of these shafts may be mounted for rotation within a housing formed, for example, of a back casting 33 and a cover plate 34. The cover 34 is removably attached to the back portion 33, as by means of screws 36, and the housing 37 so formed has a central chamber therein within which there is disposed a belt 38 extending about a pulley 39 upon the lower shaft, and a pulley 41 on the upper shaft. The belt 38 may be formed of an O ring of conventional configuration and the two pulley wheels are each formed with a circumferential V groove therein, within which the O ring 38 fits to transmit drive from the lower shaft to the upper shaft. Inasmuch as it is desired to reduce the rotational speed of the motor 18, the lower pulley is made of a much smaller diameter than the upper pulley, and it has been found that for conventional motors that a ratio of about 4 to 1 is optimum for this speed reduction.

With regard to the mounting of the reduction unit 21, this may be most readily accomplished by utilizing the motor mounting of the barbecue. Thus, conventionally the barbecue motor is mounted by means of a peripherally grooved collar fitting within a slot 17 of the barbecue hood, so as to support the motor outside of the hood and with the rotary portion thereof extending interiorly of the hood. As illustrated, the lower shaft 31 of the reduction unit may have an extended square end 42 thereon adapted to fit into this collar of the motor in the same manner as a spit.

The flexible shaft 22 extending from the reduction unit to the adapter may comprise an outer flexible sheath 46 and an inner flexible drive cable 47. The flexible shaft is operably engaged with the upper shaft 32 of the reduction unit as, for example, by extension of a square end upon the cable 47 into a square opening axially of the upper shaft 32, and a threaded connection between a retainer 48 upon the flexible shaft and a threaded boss extending from the cover 34 of the reduction unit. At the opposite end of the flexible shaft same may be provided with an enlarged prong 49 of rectangular cross-section soldered or otherwise joined to the shaft cable 47, and extending from the sheath for removable attachment to the adapter 23.

Connection of the present invention to the grill itself of the barbecue may be readily accomplished with the adapter 23 which may be formed as a generally circular plate 51 having a central upstanding boss 52 thereon with a rectangular opening axially therein to receive the prong 49 of the flexible shaft. Engagement of the adapter with the grill is facilitated by the provision of spring clips 53 extending from opposite sides of the adapter plate 51 and secured to such plate by means such as the illustrated nuts and bolts 54. These spring clips are disposed beneath the plate and are adapted to be flexed downwardly so as to slip beneath individual, horizontal bars of the grill, and may be provided with curved ends so as to firmly grip these bars when so positioned beneath same, as illustrated in FIG. 2.

It will thus be seen that the adapter is readily engaged with the grill itself by placing same over the grill at the center thereof and flexing spring clips 53 beneath horizontal bars of the grill into the position shown in FIG. 2. Inasmuch as the grill is mounted for rotation upon a vertical shaft, or the like 61, shown in phantom in FIG. 2, it will be seen that the grill will be rotated by imparting a rotary motion to the adapter.

With regard to operation of the present invention, and following mounting of same in the manner illustrated above, wherein the reduction unit is mounted by means of the lower shaft 31 thereof engaging the motor 18, and wherein the flexible shaft of the unit extends downwardly into engagement with the adapter attached to the grill, it remains only for the motor to be energized to rotate the grill. Affixing of the barbecue attachment hereof to a portable barbecue, for example, requires only a minimum of effort and time, inasmuch as the square end 42 upon the reduction unit shaft readily fits into the spit motor of the barbecue, and furthermore, the adapter 23 hereof readily snaps onto the grill at the center thereof. After these two operations, it is only necessary to extend the flexible shaft from the reduction unit downwardly to place the prong 49 of the flexible shaft into the opening in the adapter boss 52. In this position the barbecue attachment of the present invention is ready for operation. A gear reduction is afforded by the reduction unit 21, so that upon energization of the motor 18 there will be imparted to the grill a rotary motion to slowly turn same in a horizontal plane. The flexible shaft 22 hereof serves to transmit the rotary motion from the horizontal upper shaft 32 of the reduction unit to the vertical extension of the adapter 23. Conventional spit motors for portable barbecues, and the like, operate at a relatively low rotational speed, as of the order of 4½ or 6 r.p.m., so that with a reduction of 4 to 1 in the reduction unit, it will be seen that the grill of the barbecue unit is consequently rotated at about one revolution per minute. This rate of revolution has been found to be advantageous in accomplishing the objects of the present invention.

With the grill slowly rotated by the attachment of the present invention, the meat, or the like, disposed upon the grill will be slowly passed over the burning materials in the firebox under the grill, and this rate of passage is sufficient to prevent an undue collection of grease upon any one portion of the burning material, so as to thereby limit smoking and to wholly preclude flame-up. Normally charcoal, or the like, is employed for barbecuing, inasmuch as actual flames are not desired and highly undesirable results occur upon the establishment of flames in the firebox, inasmuch as such flames will tend to actually burn the meat or other foodstuffs upon the grill. In accordance with the present invention, insufficient amounts of grease are deposited upon any particular portion of the charcoal to allow flame-up. Furthermore, the continual motion of the grill thus places the meat, or the like, over successive areas of the charcoal, and consequently, evens out the heat applied to the materials upon the grill. It will thus be seen that the present invention provides for overcoming a majority of the difficulties encountered in operating barbecues, and in particular, home barbecues generally of the portable type. In particular, is the present invention adapted to cooking operations upon barbecues wherein small pieces of meat, fish or fowl are to be broiled, and wherein substantial drippings therefrom are to be encountered. Thus, in the cooking of hamburger, for example, wherein a relatively large percentage of fat may be included in the meat of the individual patties placed upon the grill, it is commonplace for this fat to be liquefied by the heat from the firebox, and consequently, to drip downwardly therein. In this respect, it is not at all uncommon for some type of fire extinguisher, such as a sprinkler or water gun to be employed as a normal and necessary barbecue accessory, in order to put out fires inadvertently started in the firebox from such grease deposits. In similar manner, the broiling of chicken parts, or the like, commonly call for the application of substantial amounts of sauces to baste the parts and thereby prevent burning of the exterior of the individual parts during the relatively prolonged period in which cooking must be carried out. Such basting operations are almost impossible to accomplish without dripping some of the sauces, or the like, from the grill downward into the firebox, and furthermore, require ready access to all of the parts upon the grill. With the present invention attached to the barbecue and in operation, it will be seen that all of the grill is successively available to the cook, so as to materially facilitate basting operations, and furthermore, to spread out the deposits of sauces, or the like, which may drip downwardly into the firebox, and consequently, to limit smoking and inadvertent flame-ups therefrom.

Of great practical advantage herein is the availability of vertical grill movement without disturbing the rotation of same. Thus, it is desirable to change the height of the grill from the fire one or more times during many barbecuing operations and the flexible drive hereof accommodates vertical grill movement without disengaging the attachment or requiring readjustment. A wide latitude of vertical grill positions is thus possible without any modification or adjustment of the driving engagement of this invention.

Although it is, of course, not necessary to employ the spit motor of a barbecue for the motive power to rotate the grill in a horizontal plane, as contemplated by the present invention, it will be appreciated that such motor is highly desirable for this use, inasmuch as same is commonly available. Furthermore, the attachment of such a motor to the barbecue hood is normally quite readily accomplished and requires no further operations upon the barbecue itself, in order to directly employ the attachment of the present invention. Thus, while it is not intended to limit the present invention to cooperation with any particular drive motor, it is herein suggested that material advantage lies in the employment of readily available motive power to minimize cost and complexity of the operation herein involved.

What is claimed is:

1. An improved barbecue comprising a fire box, a rotary grill mounted for rotation above said fire box, a spit motor with means for mounting same adjacent and radially outward of the grill, a reduction unit having a first shaft adapted to engage said spit motor and a second shaft coupled to the first through reduction means, a flexible shaft having a sheath with means for attachment of same to said reduction unit and a central cable adapted for connection to the second shaft of said reduction unit, and means connecting said cable to said grill at the center thereof to transmit motion thereto for slowly rotating the grill.

2. An improved barbecue as set forth in claim 1, further defined by said reduction unit including a housing with said first shaft extending from one side thereof with a square end to removably engage a drive shaft of the spit motor, said second shaft extending from the opposite side of said housing, and said shafts being interconnected by a belt about a small pulley on said first shaft and a large pulley on said second shaft whereby said second shaft is connected for driven rotation at a lesser rate than the first shaft.

References Cited in the file of this patent
UNITED STATES PATENTS

| | | |
|---|---|---|
| 1,044,423 | Rosa | Nov. 12, 1912 |
| 2,567,128 | Shoffner | Sept. 4, 1951 |
| 2,571,404 | Altman | Oct. 16, 1951 |
| 2,748,604 | Nemec | June 5, 1956 |
| 2,819,667 | Victor | Jan. 14, 1958 |

FOREIGN PATENTS

| | | |
|---|---|---|
| 1,096,430 | France | Feb. 2, 1955 |